Feb. 16, 1937.    R. A. SHERMAN    2,070,849
INSTRUMENT FOR CORRECTING EYES
Filed July 2, 1931    2 Sheets-Sheet 1

INVENTOR
Reuel A. Sherman
By
ATTORNEY

Feb. 16, 1937.   R. A. SHERMAN   2,070,849
INSTRUMENT FOR CORRECTING EYES
Filed July 2, 1931   2 Sheets-Sheet 2

INVENTOR
Reuel A. Sherman
By
ATTORNEY

Patented Feb. 16, 1937

2,070,849

UNITED STATES PATENT OFFICE 2,070,849

INSTRUMENT FOR CORRECTING EYES

Reuel A. Sherman, Washington, D. C.

Application July 2, 1931, Serial No. 548,328

2 Claims. (Cl. 88—20)

The present invention is designed to correct defective eyes and in accomplishing this to utilize many of the features of the ordinary stereoscope. Persons having strabismic defects ordinarily utilize the defective eye to a very small extent. By carrying out my method and utilizing the instrument it is possible to arrange a steroscope so as to accommodate the divergence of such defective eyes and through the manipulation of the stereoscope to gradually train the defective eye to less divergence, or a more nearly normal condition. The instrument also provides a ready means whereby the normal divergence of the eyes may be readily ascertained. The present invention also contemplates a treatment of eyes where one is dominant by suppressing to some extent the side of the view corresponding to the dominant eye. A further feature of the invention involves simultaneously contrasting duplicate prints with stereoscopical prints, or views of the same subject gradually building up a recognition by both eyes of proper coordination to accomplish a stereoscopic effect, or proper vision. Other features and details of the invention will appear from the specification and claims.

A preferred embodiment of the invention is illustrated in the accompanying drawings as follows:—

Figure 1:
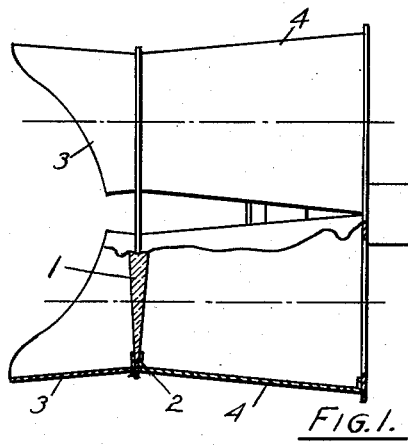

Fig. 1 shows a horizontal section of a stereoscope.

Figure 2:
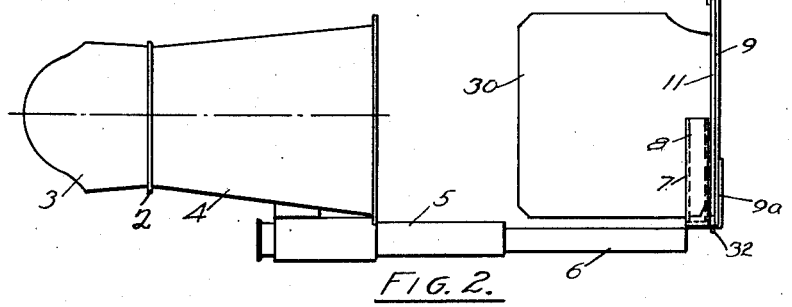

Fig. 2 a side elevation of the same.

Figure 3:
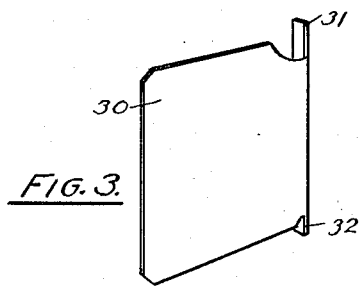

Fig. 3 a perspective view of a shadow plate for the view holder.

Figure 4:
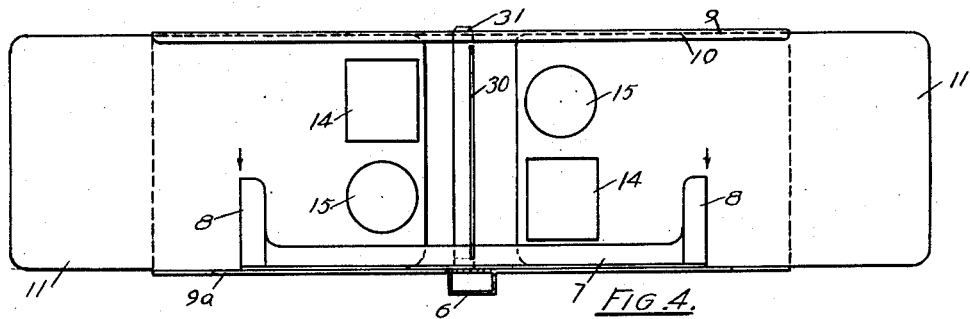

Fig. 4 an elevation from the view side of the view holder with views in place.

Figure 5:
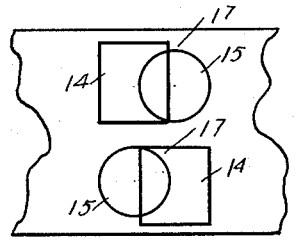

Fig. 5 is a view indicating the apparent overlapping of figures on complementary views.

Figure 6:
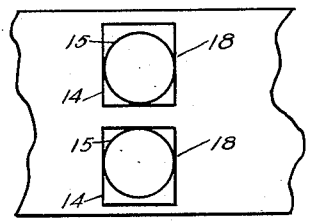

Fig. 6 a view showing the view mountings adjusted for proper fusion.

Figures 7, 8:
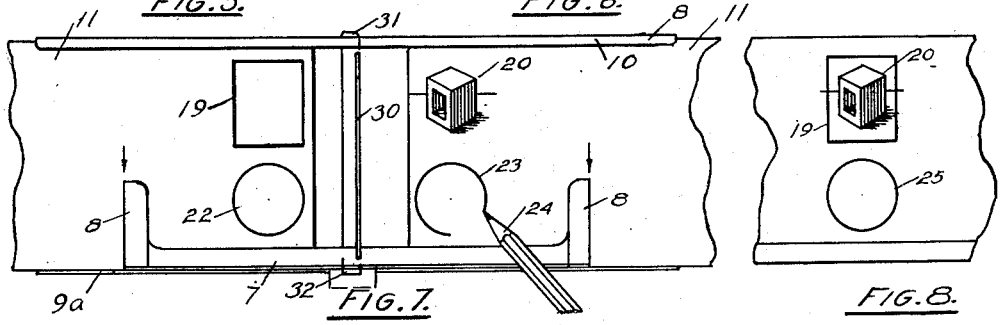

Fig. 7 a view indicating a method of testing the normal divergence of an eye.

Fig. 8 a similar view showing the views adjusted to proper fusion and indicating the impression made on the subject with the views so adjusted.

Figure 9:
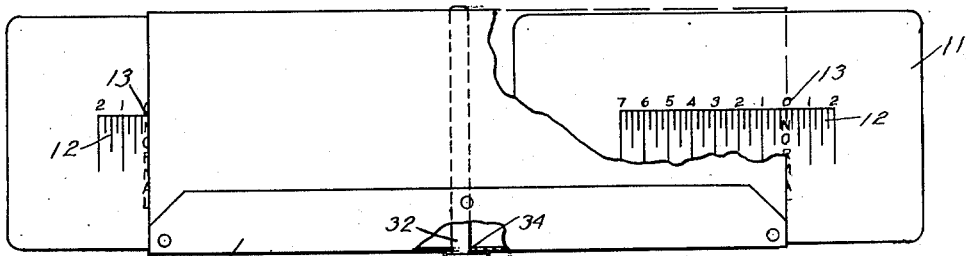

Fig. 9 a rear view of the view holder partially broken away to show the scale on the rear of the view mountings.

Figure 10:
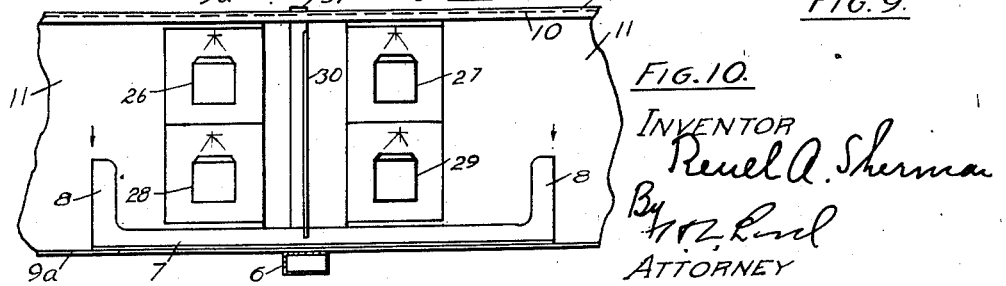

Fig. 10 a front elevation of the holder with the views in place showing variations in the definition of the figures and also contrasting a stereoscopic pair of views with duplicate views.

1 marks the lenses of the stereoscope. They are carried by the usual frame 2 in which the lenses are mounted. A visor, or eye guards 3 extend from the frame and barrels 4 segregrating the vision from the two lenses extend forwardly from the frame. A guide 5 is secured to the barrels and a view holder support 6 is telescopically mounted in the guide. A view holder 7 is secured on the support 6, and has the usual upright grooved holders 8 for receiving the usual, or ordinary view. At the rear of this view holder is a special view holder 9 which is secured by a clip 9a to the view holder 7. This plate forming the view holder 9 is turned over at its edges at 10 forming grooves for receiving view mountings and providing a guide by means of which these mountings may be moved laterally sidewise in adjusting views 11, the views being arranged with subjects at the view point adjacent to the inner edges of the view mountings and the view mountings extending beyond the view holder so as to be readily grasped by the operator and movable in and out to adjust them to different eyes having differing divergence.

In order to readily check the amount of divergence each view has a scale 12 at the backside of the view which may be readily observed by the physician, or operator. The scale is provided with a zero point 13 indicating the normal position of the views to give proper fusion with normal eyes. The views as shown in Fig. 4 are provided with figures 14 and 15, one being a circle and the other a square, and with a person having strabismic eyes these view mountings placed at the normal position, according to the scale will give an impression such as indicated at 17—17 in Fig. 5, where there is an overlapping or lack of registering in the circle and the square. By adjusting the mounting, one or the other, depending on the divergent eye, these figures may be brought into register, as indicated at 18—18 in Fig. 6. This idea is carried out a little farther in the view shown in Fig. 7 where the square 19 is opposed to some dominant feature of a view. This is indicated with a cube 20. With the view mountings properly adjusted for fusion, the cube, or prominent point of the figure will be brought within the border, or square, as shown at 19 in Fig. 8. A further check as to the divergence of strabismic eyes is afforded by placing the view, as 22, adjacent to a blank space on the complementary view mounting and having the patient draw, or indicate on the blank space a line 23 registering with his re-action by means of a pencil 24, the final view forming a fused figure, as indicated at 25, in Fig. 8. This apparent sight of the figure 22 on the blank space, as indicated at 23, is due to the reflex arc of the patient which gives the impression of the figure 22 on the blank space. With this blank view space there is nothing influencing an effort to correct the normal, or natural divergence of the impaired eye and consequently moving the view to bring the two circles into proper fusion for a normal eye will indicate the exact amount of divergence. This method may also be used to stimulate the action of the amblyopic eye.

It is also desirable in the treatment of eyes to adjust the views within the focal possibilities of the patient and to this end the views are placed at the natural point of fusion and the view for the impaired eye is adjusted so far as the fusion may be readily followed by the patient. In this way the eyes may be exercised and the fusion point gradually extended until the eye naturally focuses at the normal focal point. In using the instrument in this way it is sometimes desirable to introduce a view having a definitely known divergence for convenience rather than to accomplish this by adjustment and the view holder 7 with its guides 8 provide a means whereby this may be accomplished without removing the laterally adjustable views. The gradual adjustment, however, is much more effective than with an instrument in which the views are changed in that the momentary loss of vision creates a new condition, as distinguished from a gradual shift with the eye following the shift. With the present instrument and method the eye may be made to follow the movement of the view in its effort to focus rather than to accommodate a new condition already established.

In order also to exercise the eyes and to particularly urge the suppressed, or amblyopic eye, I provide views with a decided contrast, such contrast being indicated between views 26 and 27 and 28 and 29 (see Fig. 10), the side for the amblyopic eye being very much more definitely contrasted than the other view. The amblyopic eye is induced to take on the dominant sight and thus tends to equalize the effort of the eyes. This same effect may be accomplished by supplying the stereoscope with a shadow plate 30 by means of which the operator may place the amblyopic eye at the bright side of this plate and place the figure in front of the normal eye slightly in the shadow. This increases the effort of the amblyopic eye with the result above indicated. The shadow plate has the projections 31 and 32 which may be extended through openings 33 and 34 in the special view plate so as to lock it in place. It may be removed when it is desired to insert the ordinary view in the view holder guide 8.

It may be desirable to exercise the patient so that there may be some recognition of the stereoscopic effect which is present with normal eyes. To this end the views 26 and 27 are duplicate pictures of the same object, whereas 28 and 29 on the same mounting are stereoscopic views. The patient can recognize the focusing of both eyes on a natural subject and may be made to recognize the failure of the action of one eye by the failure to receive the stereoscopic impression from the subject. The patient can learn stereoscopic vision much more quickly by having this comparison between flat and stereoscopic vision constantly before him for comparison.

What I claim as new is:

1. A view mounting for use in stereoscopes having a pair of duplicate views thereon and a pair of stereoscopic views of the same subject, one of each pair being within the view space of each eye.

2. In a stereoscope, the combination of lenses; a frame for the lenses comprising means confining the fields from the lenses to the same right and left relation as the lenses; a holder connected with the frame; and a pair of view mountings arranged in the holder, said view mountings being individually adjustable laterally on the holder, said mountings having a pair of duplicate views of a subject and a pair of stereoscopic views of the same subject, one of each pair being within the view space of each eye.

REUEL A. SHERMAN.